United States Patent [19]

Hodkinson

[11] 4,159,810

[45] Jul. 3, 1979

[54] CASSETTE RE-WINDING DEVICE

[75] Inventor: Trevor Hodkinson, 6 Larool Pl., Engadine, Sydney, New South Wales, Australia

[73] Assignees: Trevor Hodkinson; Control Switchboards Pty, Ltd.; Neil Charles McCormack, all of New South Wales, Australia

[21] Appl. No.: 859,738

[22] Filed: Dec. 12, 1977

[30] Foreign Application Priority Data

Dec. 15, 1976 [AU] Australia .............................. PC8503

[51] Int. Cl.² ........................ G03B 1/04; G11B 15/32
[52] U.S. Cl. .................................... 242/198; 366/132
[58] Field of Search ........ 242/55.19 A, 192, 197-200; 360/92, 93, 96, 132

[56] References Cited

U.S. PATENT DOCUMENTS

| 3,304,019 | 2/1967 | Myers | 242/55.19 A |
| 3,718,297 | 2/1973 | Eagle | 242/55.19 A |
| 3,870,248 | 3/1975 | Nara et al. | 242/198 |
| 3,988,779 | 10/1976 | Leis et al. | 360/96 |

Primary Examiner—Leonard D. Christian
Attorney, Agent, or Firm—Pravel, Wilson & Gambrell

[57] ABSTRACT

A cassette re-winding device including a compartmented housing having a hinged lid to receive a cassette in one compartment having a rewind spindle connected to a battery operated motor located in the other compartment; and, an automatic switch positioned in the first-mentioned compartment which is actuated by the positioning of a cassette in the compartment.

5 Claims, 5 Drawing Figures

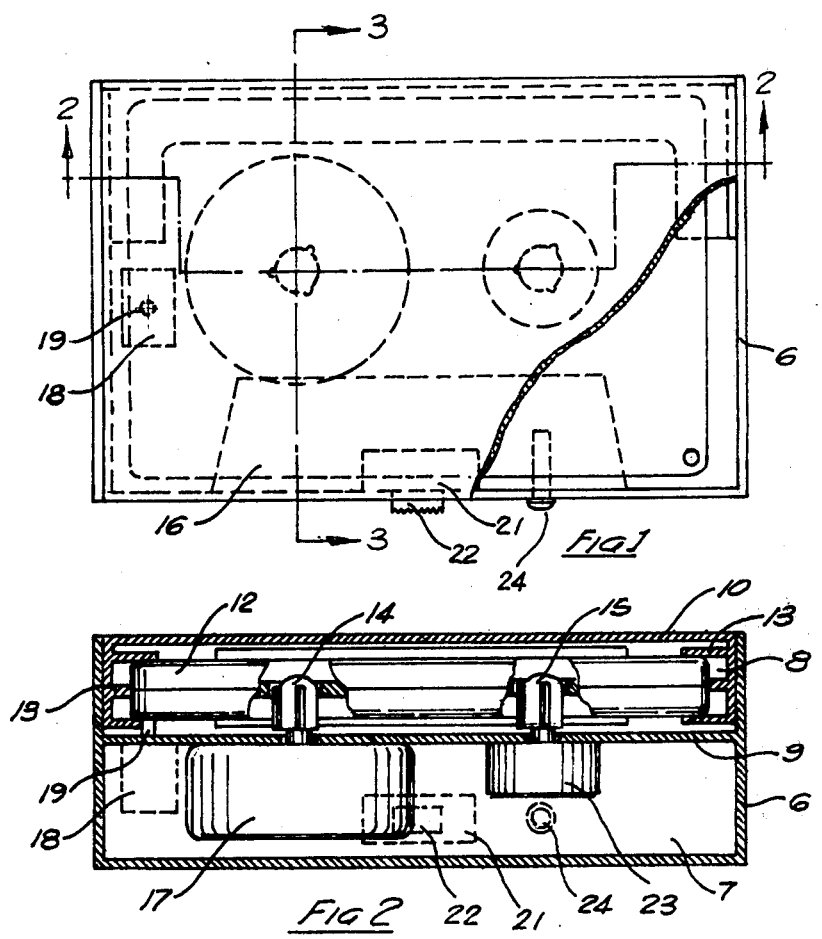

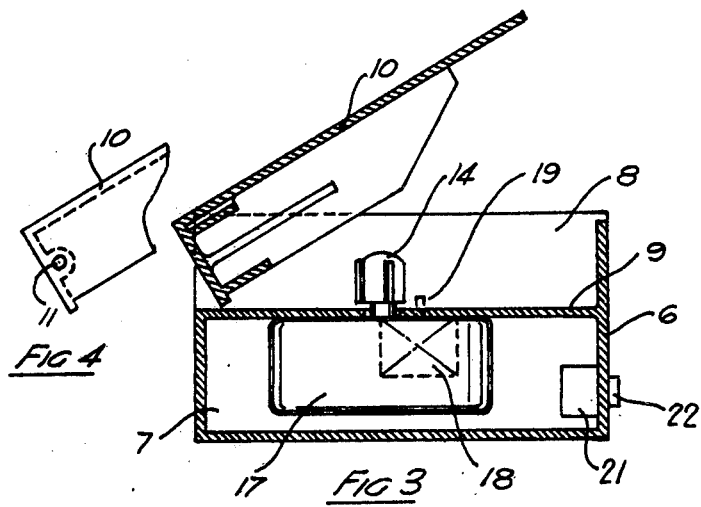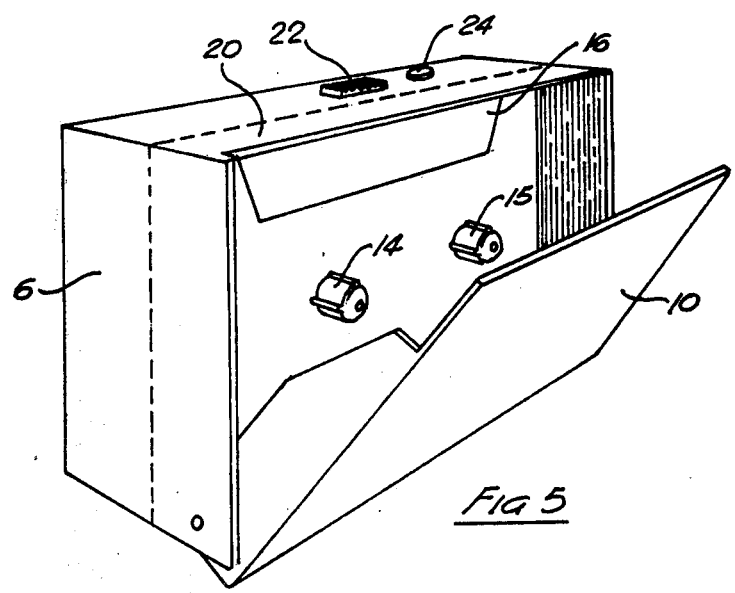

CASSETTE RE-WINDING DEVICE

BACKGROUND OF THE INVENTION

The present invention relates to magnetic tape cassettes, which provide a convenient, compact and re-usable medium for the recording of information, particularly music. While possessing these desirable qualities, the cassette suffers from a major disadvantage in that substantial rewinding may be necessary to locate the required information. The complete re-winding of a standard cassette to permit replaying of an entire track can occupy a period in the order of one minute during which the cassette player is wholly occupied with the re-winding procedure.

This problem is considerably enlarged in the case of cassette players which, for reasons of economy, do not incorporate a re-wind function. Such items include low-cost cassette players intended for automotive use where the user is compelled to play an entire track before the information reproduced at the commencement of the reverse track just completed can be again located.

SUMMARY OF THE INVENTION

It is an object of the present invention to provide a device which will ameliorate the above disadvantages in a very simple manner by providing a cassette re-winding accessory which will permit rapid re-winding while leaving the reproducing apparatus available for continuous playing.

According to the invention there is provided a battery operated magnetic tape cassette re-winding device comprising a housing having a hinged lid able slidably to receive a cassette presented thereto and move said cassette into operative position within said housing, a spindle mounted within said housing adapted to engage a spool of said cassette when in said operative position, said spindle being drivable by electric motor means mounted within said housing to wind tape onto said spool, switch means mounted within said housing operable upon movement of said cassette into said operative position to enable said motor means to drive said spindle.

BRIEF DESCRIPTION OF THE DRAWINGS

A preferred embodiment of the invention will now be described by way of example only with reference to the accompanying drawings in which:

FIG. 1 is a partly sectioned plan view of a cassette re-winding apparatus according to the invention;

FIG. 2 is a sectional view taken on line 2—2 of FIG. 1;

FIG. 3 is a sectional view taken on line 3—3 of FIG. 1 but showing the hinged door in an open position;

FIG. 4 is an end view showing part of the hinged door as illustrated in FIG. 3;

FIG. 5 is a perspective view of the device illustrated in the previous figures.

DESCRIPTION OF THE PREFERRED EMBODIMENT

Referring to the drawings, the cassette re-winding device is of compact construction and adapted to be held conveniently in the palm of a user's hand. It comprises a housing 6 divided into two compartments 7 and 8 by a partition 9. The compartment 8 is closed by a door 10 which is hinged about axis 11 and which is preferably molded from clear plastics material. The hinged door 10 is adapted to accept and cradle a standard cassette 12 which is located by appropriate flanges 13 such that when the door is closed, the cassette spools locate upon spindles 14 and 15 extending from the partition 9. An inwardly extending flange 16 aids in locating the cassette within the compartment 8 where it rests with its open edge uppermost when viewed in relation to FIG. 5.

The spindle 14 is directly coupled to an electric motor 17 located within the compartment 7. Also located within this compartment is a suitable supply of batteries which are electrically connected to the motor through a switch 18. The switch 18 is provided with a projecting tongue 19 which extends through the partition 9 and is depressed by the cassette as it moves into its operative position thereby to enable the motor to drive the re-wind spindle 14. This arrangement not only provides for automatic operation of the device but also prevents accidental operation in the event that a cassette is not in place.

The automatic switch 18 may be augmented if desired by a manual switch 21 arranged in series with it. The switch 21 preferably employs a sliding actuator 22 aligned such that the direction of movement necessary to activate the motor corresponds to the direction of tape motion along the exposed edge of the cassette. The adjacent housing wall 20 may be formed of a transparent plastics material to permit inspection of the cassette during the re-wind function.

The motor 17 which is directly coupled to the re-wind spindle 14 is preferably provided with an overload clutch or power actuated cut-off means to prevent damage to the cassette motor at the completion of a re-wind operation and prolong battery life. The free spindle 15 may be provided with appropriate friction braking means 23 to impose a substantially constant drag on the tape. In a further modification, the device may be provided with a display unit 24 which illuminates automatically to indicate the completion of a re-wind operation.

It will be appreciated that the described embodiment provides a compact and simple accessory which permits a cassette to be conveniently rewound quite independently of the playing device.

Although the invention has been described with reference to a specific example, it will be understood by those skilled in the art that the invention may be embodied in many other forms without departing from the scope of the inventive concept.

The claims defining the invention are as follows.

I claim:

1. A battery operated magnetic tape cassette rewinding device for automatically rewinding a cassette having independently mounted spools holding a magnetic tape, comprising:
    a generally rectangular housing having a partition therein which divides said housing into first and second compartments and a hinged lid mounted onto said housing over said first compartment, said hinged lid being adapted to receive and pivot to a closed position in which such cassette is in an operative position in said first compartment of said housing;
    first and second spindles mounted in said partition for rotation, said spindles being adapted to engage the spools of such cassette in said operative position in said first compartment of said housing;

electric rewind motor means mounted in said second compartment in driving connection with said first spindle;

friction braking means mounted in said second compartment in engagement with said second spindle for applying a substantially constant drag to said second spindle; and, switch means mounted in said second compartment and projecting through said partition into said first compartment for activating said electric rewind motor means in response to direct engagement by such cassette in said operative position in said first compartment in order to automatically rewind the cassette upon placement in said first compartment of said housing.

2. The structure set forth in claim 1, wherein said switch means includes:

a projecting actuating means extending through said partition into said first compartment and being connected to a rewind switch mounted in said second compartment in connection with said electric motor means, said projecting actuating means being depressed by said cassette positioned in said first compartment and, in said depressed condition, operating said switch to activate said electric rewind motor means.

3. The structure set forth in claim 1, including:

further switch means manually operable to control said first-mentioned switch means.

4. The structure set forth in claim 3, further including:

said further switch means including a slidable actuating member positioned in said housing, which slidable actuating member is movable to an actuated position for activating said electric rewind motor means by movement of the actuator member in the direction of tape motion for rewind.

5. The structure set forth in claim 4, wherein:

said hinged lid is formed of a transparent plastic material.

* * * * *